United States Patent [19]

Meynier

[11] Patent Number: 5,111,903
[45] Date of Patent: May 12, 1992

[54] SIGNAL RECEIVING SYSTEM ABLE TO BE COUPLED WITH THE WALL OF A WELL OR DRILLING

[75] Inventor: Patrick Meynier, Garennes, France

[73] Assignee: Institut Francais du Petrole, Reuil-Malmaison, France

[21] Appl. No.: 774,306

[22] Filed: Oct. 10, 1991

Related U.S. Application Data

[63] Continuation of Ser. No. 582,088, Sep. 14, 1990, abandoned, which is a continuation of Ser. No. 410,417, Sep. 21, 1989, abandoned.

[30] Foreign Application Priority Data

Sep. 21, 1988 [FR] France ............... 88 12422

[51] Int. Cl.$^5$ ............... G01V 1/40; E21B 33/127
[52] U.S. Cl. ............... 181/102; 181/112; 181/401; 367/25; 367/911
[58] Field of Search ............... 367/25, 178, 911; 181/102, 106, 112, 118, 120, 401; 166/250; 73/151, 152

[56] References Cited

U.S. PATENT DOCUMENTS

| | | | |
|---|---|---|---|
| 2,396,935 | 3/1946 | Walstrom | 181/102 |
| 2,963,641 | 12/1960 | Nanz | 181/102 |
| 4,394,754 | 7/1983 | Waters | 367/184 |

FOREIGN PATENT DOCUMENTS 0681401 8/1979 U.S.S.R. ............... 181/102

OTHER PUBLICATIONS

Hardy, H. R., "Evaluating the Stability ... Acoustic Emission"; Conference Fort Lauderdale, Fla., 1/17/74, pp. 89-94.
Rogozhnikov et al., "Design of an Ultrasound ... Rock Mass"; Izv. Acad. Sci., USSR, Phys. Solid Earth (U.S.A.), #2, 2/70, pp. 124-126.

Primary Examiner—Nelson Moskowitz
Attorney, Agent, or Firm—Antonelli, Terry, Stout & Kraus

[57] ABSTRACT

A signal receiving system adapted to be lowered into a drilling and suspended from an electro-bearer cable and adapted to be coupled with walls of the drilling so as to receive signals propagating in the surrounding formations. One or more expansible chambers are interconnected by ducts and suspended under a rigid body connected to the surface by the electro-bearer cable. Each expansible chamber includes flexible side walls into which are integrated at least one receiving element. The expansible chambers are adapted to be expanded by injecting a compressed fluid produced by a hydraulic system contained in the rigid body. The receiving elements are connected to a signal acquisition device disposed in the rigid body which communicates with a laboratory truck on a surface.

19 Claims, 2 Drawing Sheets

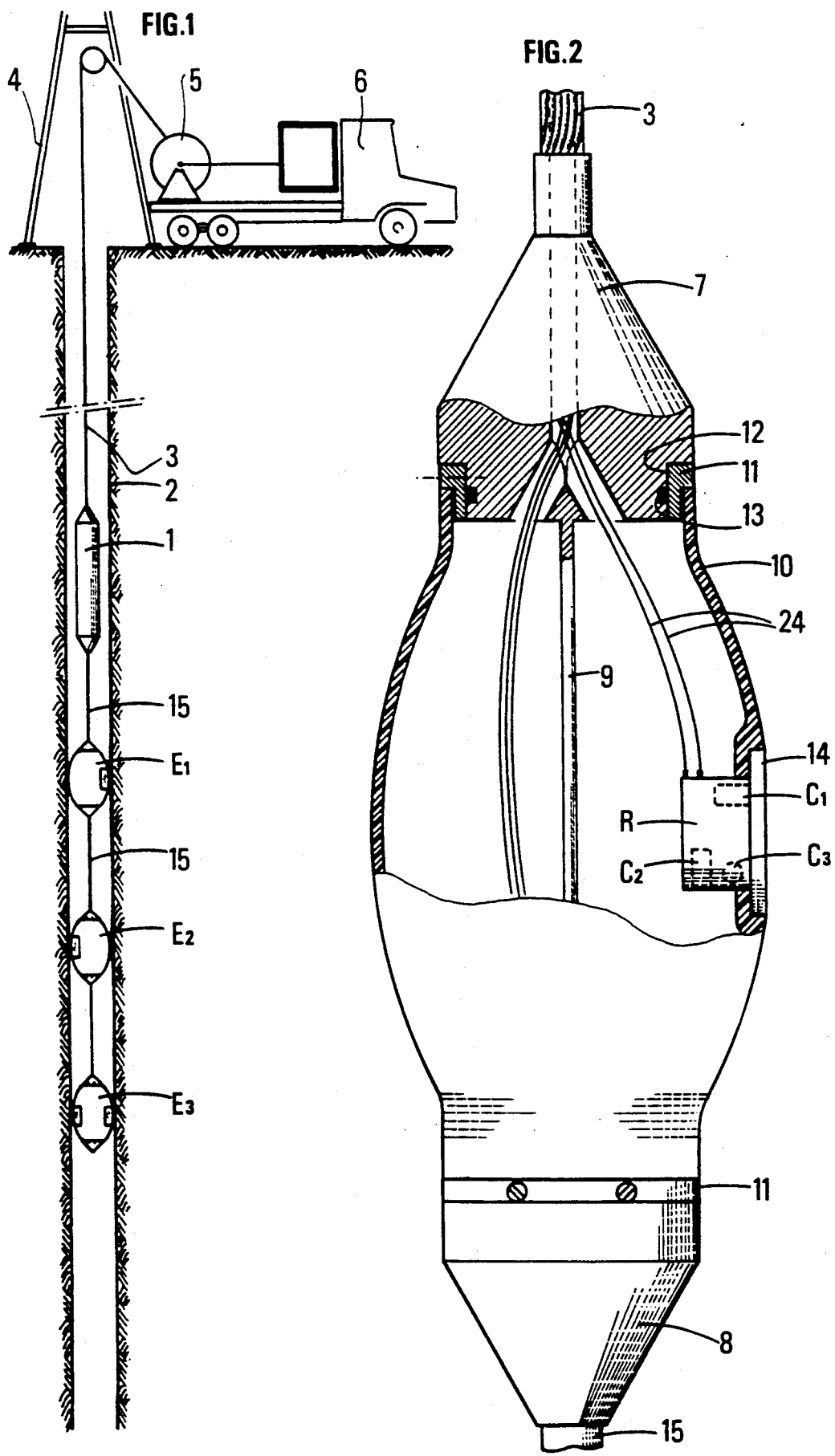

SIGNAL RECEIVING SYSTEM ABLE TO BE COUPLED WITH THE WALL OF A WELL OR DRILLING

CROSS REFERENCE TO RELATED APPLICATIONS

This application is a continuation of U.S. application Ser. No. 07/582,088, filed Sept. 14, 1990, now abandoned which is a continuation of U.S. application Ser. No. 07/410,417, filed Sept. 21, 1989, now abandoned.

FIELD OF THE INVENTION

The object of the invention is to produce a signal receiving system able to be coupled with the wall of a well or drilling. In particular, such a system may be used to collect signals received by a set of sensors in contact with the walls of a well and to digitize and store them and transmit them in coded form to a control and recording station on the surface.

BACKGROUND OF THE INVENTION

The sensed signals are, for example, waves propagated from a seismic source disposed on the surface or in another well and have been reflected by the discontinuities of the subsurface.

The acquisition of measuring data in a drilling is generally effected by lowering into the drilling a number of sensors connected to a single probe or a set of several probes suspended from a multifunctional cable. The probe or each probe comprises an elongated body and anchorage means enabling it to be coupled with the walls of the well. The sensors may be disposed in skids brought into contact with the walls by activating the anchorage means. They may also be disposed in the body of the probe and the anchorage means are disposed in such a way so as to laterally move the body and bringing the sensors into contact with the walls. The anchorage means comprise, for example, jacks fed with compressed fluid by a hydraulic system inside the body and the probe or even by springs whose release is provoked by unlocking a bolt.

The multifunction cable usually comprises a plurality of conductive lines allowing for the transmission of electric currents in order to feed the motor and all types of signals. This involves, for example, control signals transmitted to the probe from a surface laboratory and response signals sent from the sensor. The response signals are constituted by either control or test signals or by data measured by the sensors of the probe.

Various probes are, for example, described in the French Patents 2.501.380, 2.548.727 or 2.564.599 or the U.S. Pat. No. 4,578,785.

The embodiment of extended seismic sections able to be easily exploitable requires the use of receiving devices able to detect seismic signals at a large number of points at different depth levels. The receiving device must be able to be quickly moved along the wall. At each anchorage location, the coupling of sensors with the walls must be as effective as possible so as to capture the seismic signals and not unwanted signals propagating in the water column generally filling the well. The anchorage device to be used is becoming more and more complex and difficult to implement.

SUMMARY OF THE INVENTION

The receiving system according to the invention makes it possible to simplify the acquisition of signals in a well or drilling.

It is characterized in that it comprises at least one closed expansive chamber lowered into the well at the end of a bearer cable, this chamber being provided with a ductile wall, means for intermittently injecting a compressed fluid into the chamber so as to expand the latter and bring the ductile wall into contact with the walls of the well and at least one signal receiving element secured to said wall so as to be coupled with the formations traversed by the well in a chamber expansion position.

According to a first embodiment, the system comprises for example, a plurality of expansible chambers, each connected to at least one receiving element and interconnected by linking cables.

According to another embodiment, the system comprises for example a tubular expansible chamber and a plurality of receiving elements secured to the ductile wall at different locations along said chamber.

In the first case, the linking cables linking the expansible chambers comprise, for example, pipes for linking with the device supplying the compressed fluid.

The device supplying the compressed fluid may be disposed inside an expansible chamber or even inside a body separated from the chambers and disposed between the latter and the bearer cable.

The use of these expansible closed chambers provided with flexible walls and signal sensors fixed to the latter makes is possible to obtain at one go an anchorage of the chamber all around the well, regardless firstly of its shape and its surface irregularities, and secondly effective coupling of the sensor elements tightly applied against the underground formations. For expanding each chamber, the use of a device delivering a compressed fluid renders easier and faster embodiment of the intermediate phases for moving the receiving system along the wall, which makes it possible to reduce the overall period for acquiring seismic data in a well.

BRIEF DESCRIPTION OF THE DRAWINGS

Other characteristics and advantages of the system according to the invention will be more readily understood on reading the description of the two embodiments given by way of non-restrictive example, accompanied by the annexed drawings wherein:

FIG. 1 shows a general diagrammatic view of a first embodiment of the system and comprising several interconnected chambers;

FIG. 2 shows in more detail the fitting of one of these chambers;

DETAILED DESCRIPTION OF THE PREFERRED EMBODIMENTS

Figure 4:
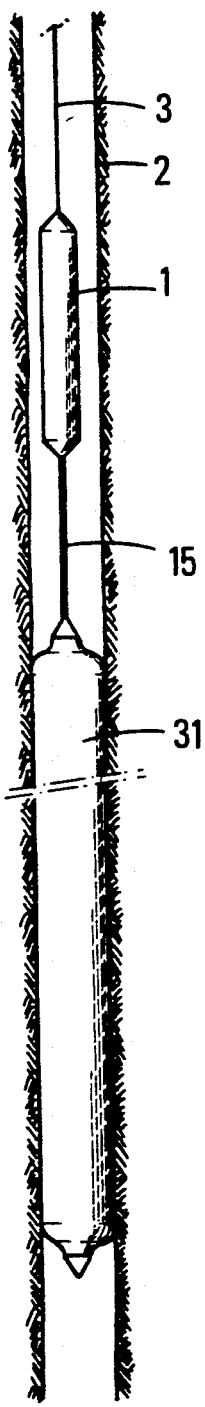
FIG. 4 diagrammatically shows a second embodiment of the system according to the invention where the expansible chamber is an elongated tube.

According to the embodiment of FIG. 1, the system according to the invention comprises a well tool 1 lowered into a well or drilling 2 at the extremity of an electrobearer cable 3 connected to a support structure 4 disposed on the surface. The cable 3 is wound onto a storage cable reel 5 disposed, for example, on a laboratory truck 6. On top of the well tool 1, suspended are several expansible chambers E1, E2, E3 etc. As shown in FIG. 2, each expansible chamber E1, E2, E3 comprises a rigid armature constituted by two truncated joining pieces 7, 8 which face each other and are connected and maintained rigidly spaced from each other by a mounting bar 9. A ductile skirt 10 is disposed between the two truncated joining pieces 7, 8 and with these delimits a sealed chamber. The ductile skirt 10 is constituted, for example, by an elastomer tube whose extremities are secured, via the duplicate molding method, respectively to two rigid rings 11. Each truncated joining piece 7, 8 is provided with a circular shoulder 12 with a section adapted to the internal section of the two rings and a circular groove for a gasket 13. Engagement of the two rings 11 onto the two circular shoulders 12 ensures the impervious closing of each chamber.

Connected to the ductile wall of each chamber is at least one signal receiving set R. This unit comprises a case provided with a base 14 and at least one housing for each receiving element. The case comprises, for example, three housings for the three sensors C1, C2, C3 disposed in such a way so as to capture the signal components along three orthogonal axes. Each base 14 is integrated with a tubular skirt 10 by duplicate molding.

Figure 3:
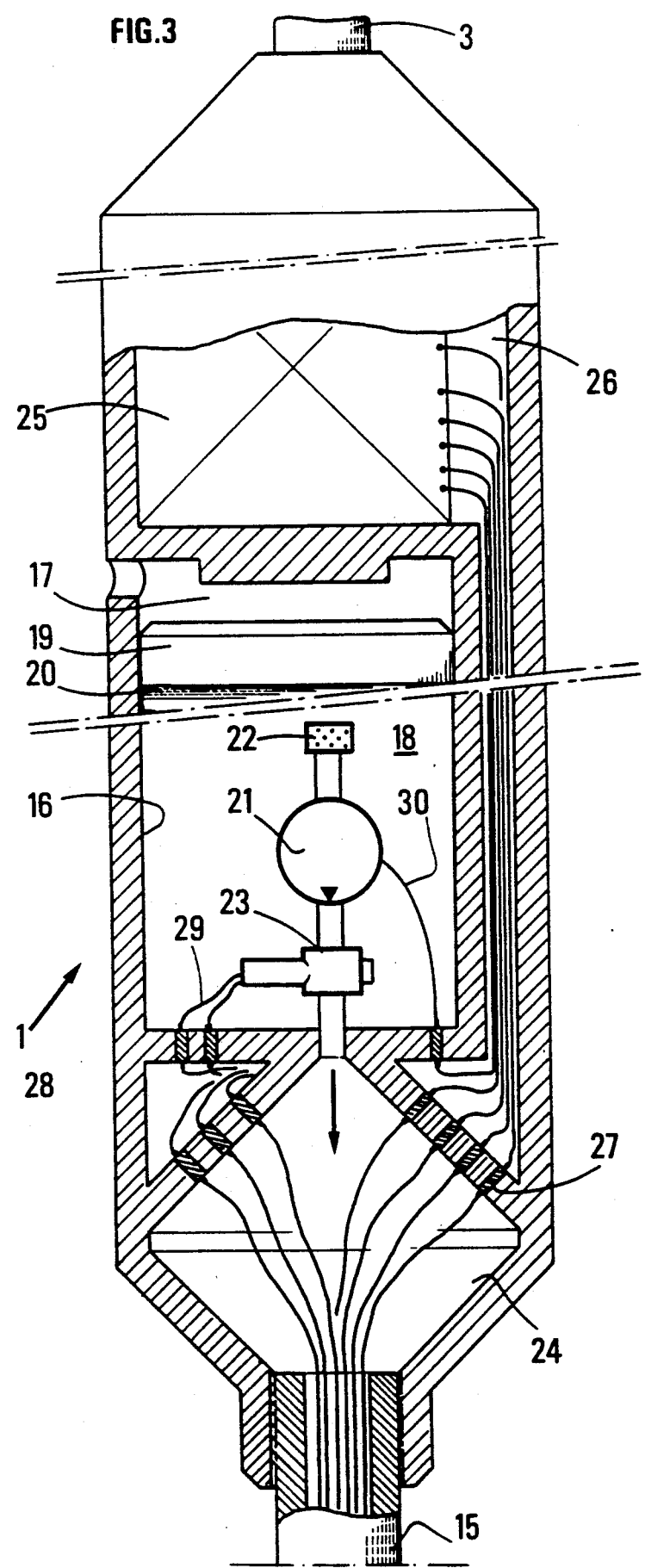
FIG. 3 diagrammatically shows the body of a tool containing a device for applying a compressed fluid to the chambers and expanding said chambers, as well as a compartment for an electronic data acquisition device.

Each impervious expansible chamber E1, E2, E3 is connected to the adjacent chambers by a cable or flexible bearer-pipe element 15. By these pipe elements 15, all the expansible chambers E1, E2, E3 communicate with a hydraulic system contained inside the well tool 1. As shown in FIG. 3, tool body comprises a cylindrical cavity 16 separated into two chambers 17, 18 by a free piston 19 provided with a gasket 20 at its periphery. In one of the two chambers 18, a hydraulic pump 21 is disposed whose inlet communicates with a filtering strainer 22 and whose outlet, by an two-position electrovalve 23, communicates with the pipe element linking the body of the well tool to the first expansible chamber E1 (FIG. 1). The chamber 18 containing the hydraulic pump 21 is filled with oil, with the other chamber 17 directly communicating with the external part of the body.

Free displacement of the piston 19 in the cavity 16 makes it possible to maintain the hydraulic liquid in equipressure with the fluid contained in the well.

The pump 21 generates an excess pressure with respect to the static pressure existing in the well, regardless of the operational depth of the receiving system. In a first position (rest position), the electrovalve 23 enables the portion of the pipe element 15 to communicate with the chamber 18 and in a second position places the same portion of the pipe element 15 in communication with the outlet of the pump 21.

Connected to each receiving set R is/are one or more lines 24 for transmitting the captured signals. The signals delivered by all the receiving sets R are collected by an acquisition and control device 25 disposed in one upper chamber 26 of the body of the tool 1 (FIG. 3). The lines 24 derived from the receiving units R of any one expansible chamber pass along the various sections of the pipe 15 and traverse the other chambers inserted between the chamber and the well tool 1. In the well tool 1, via impervious cross-connectors 27, the lines 24 penetrate into a cavity 28 isolated from external pressure and communicating with the upper chamber 26 of the body containing the acquisition device 25, and are connected to its various inputs.

Similarly, the conducting wires 29, 30 making it possible to respectively activate the electrovalve 23 and the pump 21 penetrate into the cavity 28 via impervious cross-connectors and join the control and acquisition device 25.

For example, the control and acquisition device 25, described in the French patent application published under No. 2 616 230, is used to collect the signals produced by all the receiving sets, to sample and digitize the signals and, when ordered by the surface laboratory truck 6, to transmit the digitized signals in a coded form.

The control signals derived from the laboratory truck 6 and the signals emitted in response by the acquisition and control device 25 inside the body of the well tool 1 are transmitted by the various conducting wires of the electro-bearer cable 3.

The device operates in the following manner:

With the electrovalve 23 in the rest position, the liquid inside the various chambers E1, E2, E3 etc., the interposed pipe elements 15 and the chamber 18 is in equipressure with the fluid contained in the well. The receiving system can therefore be moved along the well and brought by acting on the winch to a position where it is desired to carry out seismic readings by acting on the winch.

Starting the hydraulic pump and excitation of the electrovalve 23 are controlled from the laboratory on the surface. By means of the interposed pipe sections, the excess pressure generated by the pump is transmitted to all the chambers E1, E2, E3 which expand. The ductile skirts 10 are applied against the wall of the well and the receiving sets R integrated into the latter are plated against the underground formations.

By means of this pressurizing, anchoring of the chambers E1, E2, E3 and coupling of these sensors are carried out in one single operation. The flexibility of the skirts 10 enables the skirts 10 to locally adapt themselves to the shape of the wall and thus embody an accurate anchoring of the chambers E1, E2, E3 and a proper coupling of the sensors. The receiving of signals to be captured may thus be effected satisfactorily.

According to the embodiment of FIG. 4, the system according to the invention may also comprise a plurality of receiving units R integrated in its wall and disposed separately from each other. The hydraulic inflation systems 21–23 and the control device 25 may be disposed also in a body of the well tool 1 surmounting the expansible chamber or even constitute a sub-assembly disposed inside said chamber 31.

Without departing from the context of the invention, it is possible to replace the pipe elements 15 where the transmission lines pass by using multi-function cable elements integrating both channels for the compressed fluid and a plurality of transmission lines. In this case, the connecting of these cable elements to each expansible chamber could be effected by means of sealed electrical and hydraulic connectors.

What is claimed is:

1. System for acquiring and receiving signals in a well or drilling at an operating depth, the system comprising at least one closed expansible chamber adapted to be lowered into the well at an extremity of a cable and being provided with a ductile wall, a plurality of seismic signal sensing means each respectively accommodated in a housing, said housings of said plurality of seismic signal sensing means being integrated in said ductile wall at different locations along said at least one closed expansible chamber, local hydraulic means including hydraulic circuits and means for maintaining hydraulic fluid in said hydraulic circuits at a minimum pressure equal to a pressure existing in the well at the operating depth for intermittently injecting hydraulic fluid into the at least one closed expansible chamber so as to expand the same and bring the ductile wall into firm pressing contact with an elongated portion of the well whereby each of said seismic signal sensing means integrated into said ductile wall is directly coupled to formations traversed by the well in an expansion position of said at least one closed expansible chamber.

2. System for acquiring and receiving signals in a well or drilling at an operating depth, the system comprising a plurality of seismic signal sensing means each respectively accommodated in a housing, a plurality of expansible chambers interconnected by linking cables and adapted to be lowered into the well at an extremity of a cable, each of said closed expansible chambers being provided with a ductile wall having the housing of at least one of the plurality of seismic signal sensing means integrated therein, local hydraulic pressure means including hydraulic circuits and means for maintaining hydraulic fluid in said hydraulic circuits at a minimum pressure equal to the pressure existing in the well at the operating depth for intermittently injecting a compressed fluid into each of said closed expansible chambers so as to expand the same and bring the ductile wall of each of said closed expansible chambers into firm pressing engagement with walls of the well whereby each seismic signal sensing means integrated into the ductile wall in the respective closed expansible chambers is directly coupled to formations traversed by the well in an expansion position of the closed expansible chambers.

3. System according to claim 1, wherein said means for intermittently injecting the fluid is disposed in said at least one closed expansible chamber.

4. System according to claim 2, wherein said linking cables include pipe means for connecting said expansible closed chambers with the means for intermittently injecting the fluid.

5. System according to claim 1, wherein the means for intermittently injecting the fluid are disposed in a body located in the well and separated from said at least one closed expansible chamber and disposed between the at least one closed expansible chamber and said cable.

6. System according to claim 1, further comprising electronic signal acquisition means connected to said seismic signal sensing means, a recording and control assembly located on a surface, and wherein said cable includes signal transmission circuits linking said electronic signal acquisition means to said recording and control assembly.

7. System according to claim 6, comprising a body disposed in the well and separate from said at least one closed expansible chamber and disposed between said at least one closed expansible chamber and said cable, and wherein said electronic acquisition means is disposed inside said body.

8. System according to claim 1, wherein at least one seismic signal sensing means includes a geophone.

9. System according to claim 1, wherein at least one seismic signal sensing means comprises a triaxial geophone.

10. System according to claim 4, wherein the linking cables comprise transmission lines passing inside the pipe means.

11. System according to claim 4, wherein the linking cables are multifunctional cable elements.

12. System according to claim 11, wherein the multifunctional cable elements are connected to each of said closed expansible chambers by hydraulic and electric connectors.

13. System according to claim 2, wherein said means for intermittently injecting the fluid is disposed in at least one of said plurality of closed expansible chambers.

14. System according to claim 2, wherein the means for intermittently injecting the fluid is disposed in a body separate from said plurality of closed expansible chambers, said body being disposed between one of said plurality of closed expansible chambers and the extremity of said cable.

15. System according to claim 2, further comprising electronic signal acquisition means connected to said seismic signal sensing means, a recording and control assembly located on a surface, and wherein said cable includes signal transmission circuits linking said electronic signal acquisition means to said recording and control assembly.

16. System according to claim 15, further comprising a body separate from said plurality of closed expansible chambers, said body being disposed between one of said plurality of closed expansible chambers and an extremity of said cable, and wherein said electronic acquisition means is disposed inside said body.

17. System for acquiring and receiving a seismic signal in a well at an operating depth, the system comprising: at least one elongated closed expansible chamber provided with a ductile wall; a plurality of seismic signal sensing means each respectively accommodated in a housing, the housings of said seismic signal sensing means being respectively integrated in said ductile wall at different locations along said elongated closed expansible chamber; a rigid body adapted to be lowered into a well at an end of a cable provided with signal transmission lines connected to a central control and recording assembly outside the well, said rigid body including a first compartment, a hydraulic assembly in said first compartment comprising means for providing a fluid under pressure, hydraulic circuits and automatic means for maintaining the hydraulic fluid in said hydraulic circuits at a minimum pressure equal to a pressure existing in the well at the operating depth, said rigid body including a second compartment separated from said first compartment by a partition wall for accommodating a control and acquisition assembly; a flexible hydraulic line portion for suspending said at least one elongated closed expansible chamber to the rigid body, said elongated closed expansible chamber communicating with the hydraulic assembly in said first compartment through said flexible hydraulic line portion; electric conductor means for electrically connecting the seismic signal sensing means with said control and acquisition assembly in said second compartment of the rigid body, said electric conductor means running along said flexible hydraulic line portion; and impervious connecting means extending through said partition wall, wherein said hydraulic assembly intermittently injects fluid into said elongated closed expansible chamber so as to expand the same and bring said ductile wall into firm pressing contact with an elongated portion of the well whereby each of said seismic signal sensing means integrated into the ductile wall is directly coupled to formations traversed by the well in an expansion position of said at least one elongated closed expansible chamber and is spaced from said wall in a retracted position of said at least one elongated closed expansible chamber.

18. System for acquiring and receiving a seismic signal in a well at an operating depth, the system comprising: a plurality of elongated closed expansible chambers provided with a ductile wall; a plurality of seismic signal sensing means each respectively accommodated in a housing, the housings of said seismic signal sensing means being respectively integrated in the ductile walls of the respective elongated closed expansible chambers; a rigid body adapted to be lowered into a well at an end of a cable provided with signal transmission lines connected to a central control and recording assembly outside the well, said rigid body including a first compartment, a hydraulic assembly in said first compartment comprising means for providing a fluid under pressure, hydraulic circuits, and automatic means for maintaining the hydraulic fluid in said hydraulic circuits at a minimum pressure equal to a pressure existing in the well at the operating depth, said rigid body further comprising a second compartment separated from said first compartment by a partition wall for accommodating a control and acquisition assembly; flexible hydraulic line portions interposed between said elongated closed expansible chambers for suspending said elongated closed expansible chambers to the rigid body, all of said elongated closed expansible chambers communicating with the hydraulic assembly in the first compartment through said flexible hydraulic line portions; electric conductor means for electrically connecting the seismic signal sensing means with said control and acquisition assembly in said second compartment of the rigid body, said electric conductor means running along said flexible hydraulic line portion; and impervious connecting means extending through said partition wall, wherein said hydraulic assembly intermittently injects fluid into said plurality of elongated closed expansible chambers so as to expand the same and bring the ductile wall thereof into firm pressing contact with an elongated portion of the well whereby each of said seismic signal sensing means integrated into the ductile walls is directly coupled to formations traversed by the well in an expansion position of said elongated closed expansible chambers and separate from the wall in a retracted position of said elongated closed expansible chambers.

19. A method for acquiring and receiving seismic signals in a well at successive operating positions, the method comprising the steps of: lowering a well probe in a retracted position in the well, said well probe comprising at least one elongated closed expansible chamber provided with a ductile wall, a plurality of said seismic signal sensing means each respectively accommodated in a housing, the housings of said seismic signal sensing means being respectively integrated in the ductile wall at different locations along said closed expansible chambers; lowering a rigid body into the well at an end of a cable provided with signal transmission lines connected to a central control and recording assembly outside the well, said rigid body including a first compartment, a hydraulic assembly in said first compartment comprising means for providing a fluid under pressure, hydraulic circuits, and automatic means for maintaining the hydraulic fluid in said hydraulic circuits at a minimum pressure equal to a pressure existing in the well at the operating depth, said rigid body further including a second compartment separated from the first compartment by a partition wall for accommodating a control and acquisition assembly, said elongated closed expansible chamber being suspended to the rigid body by a flexible hydraulic line portion and communicating with the hydraulic assembly in the first compartment through said flexible hydraulic line portion, said seismic signal sensing means being electrically connected with said control and acquisition assembly in said second compartment of the body through electrical conductor means running along said flexible hydraulic lines, and impervious connecting means passing through said partition wall; expanding, upon reaching one of said operating positions, said at least one elongated closed expansible chamber so as to expand the same and bring the ductile wall into firm pressing contact with an elongated portion of the wall whereby each of said seismic signal sensing means is integrated in the ductile wall is directly coupled to formation traversed by the well in an expansion position of said at least one elongated closed expansible chamber; and retracting said at least one expansible chamber prior to displacing the well probe to another of said operating positions.

* * * * *